Figure 1:
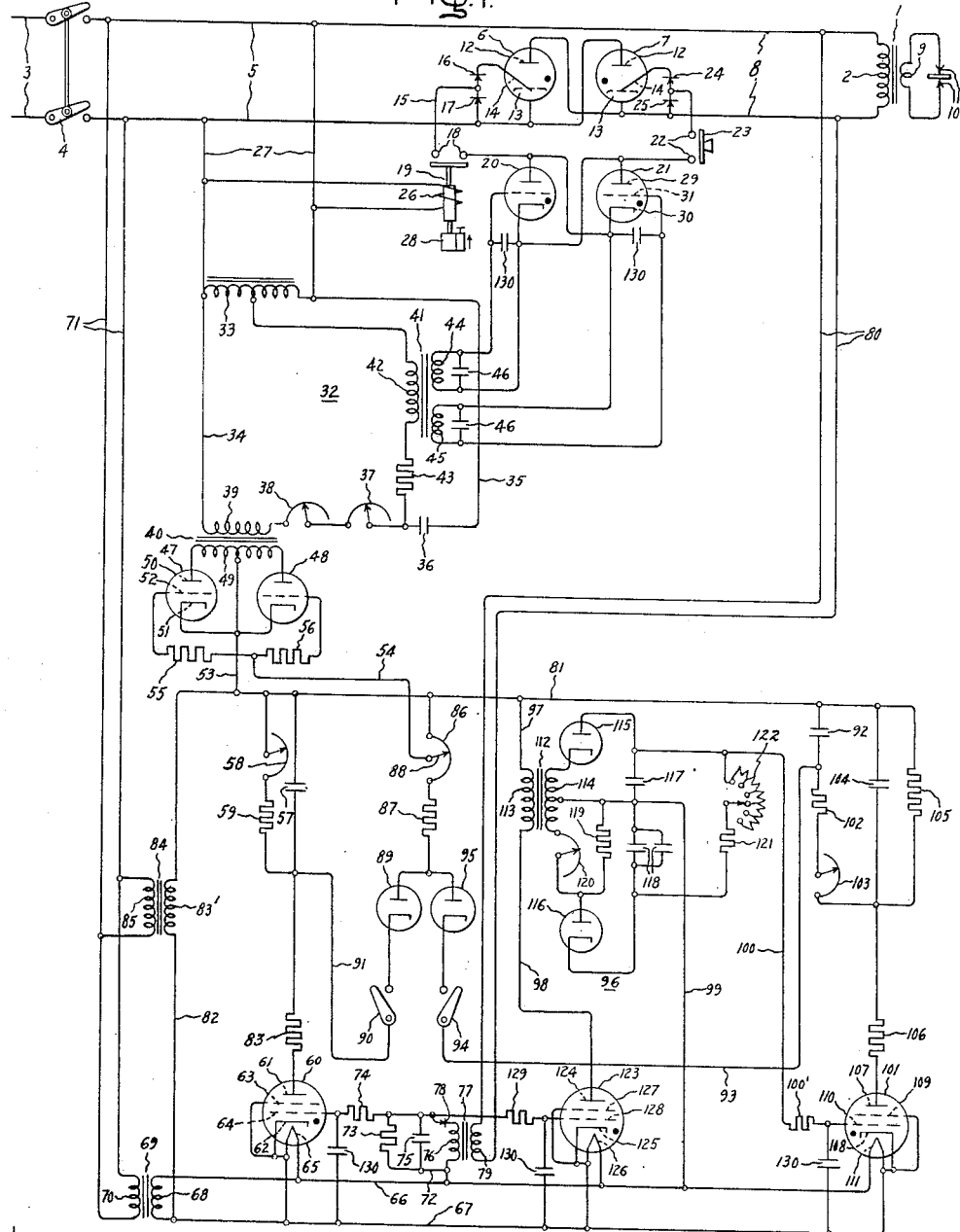

June 21, 1955    R. O. JOHNSEN ET AL    2,711,506
SLOPE CONTROL FOR LOADS SUCH AS RESISTANCE WELDS
Filed Sept. 20, 1952

Inventors:
William B. Hills,
Robert O. Johnsen;
by
Their Attorney.

United States Patent Office 2,711,506
Patented June 21, 1955

2,711,506

SLOPE CONTROL FOR LOADS SUCH AS RESISTANCE WELDS

Robert O. Johnsen and William B. Hills, Schenectady, N. Y., assignors to General Electric Company, a corporation of New York Application September 20, 1952, Serial No. 310,614

10 Claims. (Cl. 323—18)

My invention relates to electronic control apparatus particularly suited for use in resistance welding operations for gradually increasing the welding current at the beginning of a welding operation or gradually decreasing the welding current at the end of a welding operation or for both increasing and decreasing the welding current at the beginning and at the end of the same welding operation. This procedure and the apparatus therefore is commonly referred to as slope control. The gradual increase of current flow from a lower value to a fixed level welding value is commonly referred to as "up" slope control and the gradual decrease of current flow from the fixed level welding value to a lower value is commonly referred to as "down" slope control or "taper" control although the terminology of "positive" and "negative" slope control is also employed for identifying these features.

There are many desirable results obtainable with slope control when resistance welding certain metals and alloys. This is particularly true with regard to resistance welding of certain aluminum alloys and projection resistance welding of certain other metals and alloys.

In resistance welding the parts to be joined are locally heated to a welding temperature by passing an electric current through them by means of artificially cooled electrodes which are forced into engagement with the parts to secure the desired welding pressure. In a great many resistance welding operations slope control is productive of the following advantages. Thus, if the rate of current rise is excessive at the beginning of a resistance weld, more electrode force will be required than normal but by controlling the rate of current rise with up slope control it is possible to use lower electrode force and at the same time reduce the peak current demand. Up slope control also prevents metal pickup by the welding electrodes. Down slope control eliminates severe quenching of the weld and the resulting internal cracks in the weld produced at the end of a weld period by the cooled electrodes of the welding machine. In the past this severe quenching action has been minimized by applying a forging pressure to the weld after its formation or by increasing the weld time which would often cause separation of work parts of sheet material. A gradual reduction of the current at the end of the weld by using down slope control reduces severe quenching and eliminates internal cracks in the weld without the use of forging pressure. Porosity may also occur in the weld due to too rapid a current rise or inadequate post weld forging pressure. Since up slope control determines the rate of current rise and down slope control eliminates the necessity for post weld forging pressure, porosity can be eliminated by the proper use of up and down slope control. These controls also eliminate excessive electrode indentation of the work since up slope control eliminates the necessity of high electrode pressure and down slope control removes the necessity for forging pressure applied through the electrodes. Thus by using slope control, it is generally possible to eliminate the more serious product defects that occur in spot welding such as surface burning, cracks, excessive indentation, sheet separation, expulsion of metal, and porosity. There are also the further equipment advantages of using lower electrode pressures, reducing the current demand, and avoiding the necessity of using low inertia welding heads so that the electrode can promptly follow the deformation of the work without producing burning and expulsion of metal from the weld.

Various circuit arrangements have heretofore been proposed to secure the benefits of slope control either as a built-in feature of a unit welding control or as an attachment or addition to existing controls not possessed of the desired operating characteristics required for slope control.

It is an object of my invention to provide an improved slope control of simplified construction which may be embodied as an integral part of an electronic resistance welding control or supplied as an attachment for imparting slope control to existing electronic resistance welding controls not embodying this feature.

It is a further object of my invention to provide apparatus which selectively provides up slope control, down slope control or both such controls which are automatically effective at the beginning and end of a weld period of fixed level current flow of predetermined duration.

It is also an object of my invention to provide slope controls which are completely electronic and which consequently embody no mechanical moving parts which through wear or non-uniform operation may cause faulty operation to occur during the control period.

Further objects and advantages of my invention will become apparent from a consideration of the particular embodiment thereof illustrated in the accompanying drawing.

Fig. 1 of this drawing is a circuit diagram of a slope control embodying my invention.

Figure 2:
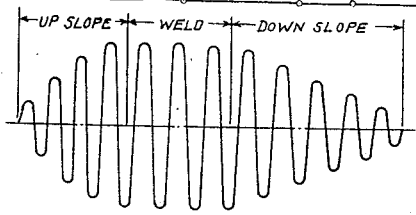

Fig. 2 of this drawing is an equivalent sinusoidal trace showing the gradual increase and decrease of welding current to and from a fixed level value which may be secured by one of the many adjustments of the control circuit shown in Fig. 1 of the drawing.

In accordance with the embodiment of my invention shown in the accompanying drawing, the primary winding of a welding transformer is supplied with alternating current through the anode-cathode circuits of a pair of reversely connected electric discharge devices having control elements excited from a phase shift circuit, one element of which has its impedance increased or decreased in accordance with the variation in voltage across one or the other of two capacitors forming part of the control gradually to vary the phase relationship between the control element and anode voltages of the electric discharge devices and cause current flow to start earlier or later during the positive half cycles of the anode voltages of the electric discharge devices and thus vary the magnitude of current flow to the welding transformer. The variable impedance of the phase shift circuit in the illustrated embodiment of my invention is an impedance controlling transformer having its primary winding connected in the phase shift circuit and having its secondary winding controllably short-circuited through a full wave rectifier connection comprising a pair of variable conductivity electric valves having principal electrodes connected in circuit with the transformer secondary winding and control electrodes for varying the current flow between their principal electrodes. Upon the flow of welding current, the charging circuit of one of the capacitors above referred to is interrupted and its discharge rate varies the voltage applied to the control elements of the above-referred to pair of variable conductivity electric valves to vary the effective resistance of the primary winding of the impedance controlling transformer from a high value to a low value and thus secure up slope control in the welding circuit by operation of the phase shift circuit thus controlled. A predetermined time after the flow of fixed level welding current is initiated, known as down slope delay, the charging circuit of the other capacitor above referred to is initiated and its change of voltage during charging varies the voltage applied to the control elements of the pair of variable conductivity electric valves to vary the effective resistance of the primary winding of the impedance controlling transformer from a low value to a high value and thus secure down slope control in the welding circuit by operation of the phase shift circuit thus controlled. Connections are also provided for automatically switching and isolating the control provided by the two capacitors so that each is effective in its turn when both are employed. Switching is also provided so that each capacitor may be selectably employed or so that the slope control may be effectively disconnected from the remainder of the welding control if such operation is desired.

My invention will be better understood from a detailed consideration of the embodiment thereof illustrated in Fig. 1 of the drawing. As there shown, a welding transformer 1 has its primary winding 2 connected to a source of alternating current supply 3 through a switch 4, supply conductors 5, reversely connected main electric discharge devices 6 and 7, and load conductors 8. The secondary winding 9 of the welding transformer 1 is connected to a pair of resistance welding electrodes 10 forming part of a resistance welding machine. These electrodes 10 are forced into engagement with the work by the welding machine and supply welding current thereto.

As illustrated in the drawing, the main electric discharge devices 6 and 7 are ignitrons each having an anode 12, a mercury pool cathode 13 and a control element 14 of high resistance material having its end immersed in the mercury pool cathode 13. The electrodes of these devices 6 and 7 are enclosed in envelopes which contain a gas or vapor such as mercury or argon. This has been indicated in the drawing by the dot associated with the cathodes of these devices.

Conduction of main electric discharge devices 6 and 7 is initiated during positive half cycles of their anode voltages by passing an exciting current through their control elements 14 and cathodes 15 to initiate ionization within these devices. Current is supplied to the control elements 14 through a control element circuit 15 including a pair of rectifiers 16 and 17 connected in series with one another between the control element 14 and cathode 13 of electric discharge device 6 and poled for conducting current from its cathode to its control element, contacts 18 of a relay 19, a pair of reversely connected firing electric discharge devices 20 and 21, contacts 22 of a pushbutton switch 23 and rectifiers 24 and 25 connected in series with one another between the control element 14 and cathode 13 of electric discharge device 7 and poled for conducting current from its cathode to its control element. Thus when relay 19 completes a circuit through its contacts 18 and the operator by depressing pushbutton 23 completes its circuit through it contacts 22, main electric discharge devices 6 and 7 will become conducting at times in their half cycles of positive anode voltages when firing electric discharge devices 20 and 21 also become conducting.

Relay 19 is a time delay closing relay having an operating winding 26 connected across the supply conductors 5 through conductors 27 and having a dashpot 28 which may be adjusted in order to impose a predetermined time delay in the closing of its contacts. This relay is just one of many arrangements that may be employed for incapacitating operation of the system until the various electric discharge devices having heated cathodes have arrived at an operating temperature following the closure of switch 4 which connects the control to the source of alternating current supply. The pushbutton switch 23 is a simplification of the usually employed more elaborate timing circuit for determining the overall welding period during which current flows to the welding transformer.

The reversely connected firing electric discharge devices 20 and 21 connected in control circuit 15 are each provided with an anode 29, a cathode 30 and a control element 31. The cathodes 30 are heated by elements receiving current from the supply conductors 5 through transformers not shown. These heating elements and the connections thereto have been omitted from the drawing in order to simplify it. The electrodes of these devices are enclosed in envelopes having a gaseous atmosphere such as mercury, argon or the like as has been indicated in the drawing by the dot associated with their cathodes. These devices may be thyratrons such as are commonly employed in the firing circuits of ignitrons.

The time during positive half cycles of anode voltage at which devices 20 and 21 become conducting is determined by the phase of the exciting voltage applied to their grids or control elements relative to the voltage applied to their anodes. This relationship is controlled by means of a phase shift circuit 32 which is excited from the supply conductors 5 and applies control voltages between the control elements 31 and cathodes 30 of firing electric discharge devices 20 and 21. The phase shift circuit 32 is illustrative of many that may be employed for this purpose. It comprises a mid-tap inductance 33 connected to supply conductors 5 through conductors 27 which also supply energization through conductors 34 and 35 to the series connected capacitor 36, adjustable resistances 37 and 38 and the primary winding 39 of an impedance controlling transformer 40, all of which series connected elements are connected in parallel with inductance 33. The output voltage of controllable phase shift is supplied by a transformer 41 having its primary 42 connected in series with a resistance 43 between the mid tap of inductance 33 and the common junction point of capacitor 36 and adjustable resistor 37. Transformer 41 is provided with secondaries 44 and 45 which are connected respectively in the control element circuits of firing electric discharge devices 20 and 21 between their respective cathodes 30 and control elements 31. Each of the secondaries 44 and 45 of transformer 41 has a capacitor 46 connected in parallel therewith. The effect of these capacitors is reflected in the primary circuit of transformer 41 and in conjunction with resistor 43 connected in series with the primary winding 42 of transformer 41 provide a tuned circuit which improves the operation of the phase shift circuit 32. Adjustable resistor 37 is employed for setting the full heat limit of the phase shift circuit 32, that is for supplying control element to cathode firing voltages to the electric discharge devices 20 and 21 at the power factor phase angle of the resistance welding circuit. By properly setting this resistor 37 the flow of welding current cannot be initiated ahead of its power factor phase angle with the consequent production of transients in the welding circuit. The adjustable resistor 38 provides an adjustment for the final heat setting of the phase shift circuit 32, that is the magnitude of current flow at fixed level heat between the up slope and down slope periods of control. The impedance value of the primary winding 39 of controlling transformer 40 is determined by the up and down slope control features which will now be described.

The adjustable impedance provided by the primary winding 39 of transformer 40 is obtained by varying the resistance value of a pair of variable conductivity electric valves 47 and 48 which are connected with the mid-tap secondary winding 49 of transformer 40 to provide a controllable full wave rectifier short circuit therefor. As illustrated, these electric valves are electric discharge devices of the vacuum type and may be of the type known as 6AS7's. Each of these valves has an anode 50, a cathode 51 and a control element 52. The conductivity between the principal electrodes 50 and 51 of these valves is determined by the excitation applied between their control electrodes 52 and one of their principal electrodes 51. Exciting current is supplied to these electric valves through conductors 53 and 54. Conductor 53 is connected to their cathodes 51 and conductor 54 is connected through current limiting resistors 55 and 56 to their control elements 52. The principal electrodes of like character of these electric vales are respectively connected to the end terminals and to the mid-tap of secondary winding 49 of transformer 40. As illustrated in the drawing, anodes 50 of valves 47 and 48 are connected to the end terminals of winding 49 and cathodes 51 of these valves are connected to the mid-tap of this secondary winding 49. The conductivity and hence resistance of valves 47 and 48 is determined by the magnitude of the excitation voltage applied to their excitation circuit 53, 54. Thus by varying the resistance of valves 47 and 48, the resistance of the secondary winding 49 of transformer is also varied and this resistance change is reflected in the primary winding 39 of transformer 40. The change in resistance of primary winding 39 of transformer 40 changes the phase shift setting of circuit 32 and consequently the phase of the exciting voltages applied between the control elements and cathodes of firing electric discharge devices 20 and 21 relative to the anode voltages of these devices. The controlling transformer 40 is preferably of a special design so that the resistance value of its primary winding 39 may be reduced to a very low value when the effective resistance of electric valves 47 and 48 have been reduced to a very low value.

The up slope control is determined by the decay of voltage across a capacitor 57. The rate of this voltage decay is determined by the adjustment of a discharge circuit including an adjustable resistor 58 and a fixed resistor 59 connected in series with one another across the terminals of capacitor 57. Capacitor 57 is charged from the supply conductors 5 through a controlled rectifier 60 having an anode 61, a cathode 62 and control elements 63 and 64. These electrodes are enclosed within an envelope which contains a gas or vapor as indicated by the dot associated with its cathode as illustrated in the drawing. Controlled rectifier 60 is an electric discharge device and may be a thyratron. Since the voltage applied to the heating element 65 for its cathode 62 is employed as a control voltage, the heating circuit therefor has been illustrated in the drawing.

Heating element 65 of rectifier 60 is connected across a pair of heating circuit conductors 66 and 67 supplied by the secondary 68 of a transformer 69 having its primary 70 connected through conductors 71 to the supply conductors 5. The cathode 62 of rectifier 60 is connected to conductor 67 which, by the circuit arrangement employed, is at negative polarity when the anode 61 of the rectifier 60 is at a positive polarity. The other conductor 66 which is at positive polarity, due to the connections employed, is connected through a conductor 72 and resistors 73 and 74 to the control element 64 of rectifier 60. Resistor 73 is connected across the terminals of a capacitor 75 which may be charged through the secondary winding 76 of a transformer 77 and a rectifier 78 connected in circuit with capacitor 75 and the secondary winding 76 of transformer 77 to present a negative voltage to the control element 64 of rectifier 60. The primary winding 79 of transformer 77 is connected through a pair of control conductors 80 across load conductors 8 of the welding circuit. Thus when load conductors 8 of the welding circuit are de-energized control element 64 of rectifier 60 is connected to conductor 66 which is at a positive potential relative to conductor 67 which is connected to cathode 62 of rectifier 60. Thus the voltage of the secondary winding 68 of the heating circuit is employed as a control voltage to insure positive conduction of rectifier 60 in the absence of any charge across capacitor 75 which is connected in the control element circuit for control element 64. However, when load conductors 8 are energized and capacitor 75 is charged, the negative voltage supplied thereby to control element 64 renders rectifier 60 non-conducting. As shown in the drawing, control element 63 of rectifier 60 is connected to its cathode 62.

Up slope control capacitor 57 is connected across auxiliary supply conductors 81 and 82 through a resistor 83, the anode-cathode circuit of rectifier 60 and conductor 67. Conductors 81 and 82 are energized by the secondary winding 83' of a transformer 84 having its primary winding 85 connected across supply conductors 5 through conductors 71. Thus when switch 4 is closed to connect supply conductors 5 to the source of supply 3, rectifier 60 becomes effective after a time delay by means not shown to charge capacitor 57 and this charging circuit is maintained until load conductors 8 are energized at which time rectifier 60 becomes non-conducting and capacitor 57 begins to discharge through its discharge circuits 58 and 59.

The voltage of capacitor 57 is applied to the control circuit 53, 54 of electric valves 47 and 48 through a potentiometer formed by the series connected resistors 86 and 87. One of the control circuit conductors 54 for electric valves 47 and 48 is connected to an adjustable slider 88 forming part of resistor 86 and the other control conductor 53 is connected to conductor 81 which is also connected to one of the terminals of capacitor 57 and one of the end terminals of potentiometer 86, 87. Capacitor 57 is connected across potentiometer 86, 87 through conductor 81 and through conductor 91, switch 90, and diode 89. Thus as capacitor 57 discharges, the amount of negative bias voltage impressed in the control circuit 53, 54 of electric valves 47 and 48 gradually decreases and these electric valves become more and more conducting to reduce the impedance value of the primary winding 39 of impedance controlling transformer 40 from a high value to a low value. The phase shift circuit 32 responds to this change by advancing the phase of the voltage applied to the control element 31 of electric discharge devices 20 and 21 which consequently become conducting at times earlier and earlier in their positive anode voltages so that the main electric discharge devices 6 and 7 also become conducting earlier and earlier in their positive anode voltages to increase the magnitude of current flow supplied to the primary winding 2 of the welding transformer 1, from the low value determined by the setting of slider 88 of potentiometer 86 to a value determined by the setting of the final heat control adjustable resistor 38 of the phase shift circuit 32.

Down slope control is determined by the charging rate of a capacitor 92 whose terminals are connected across potentiometer 86 and 87 through conductor 81 and through conductor 93, switch 94 and diode 95. It is to be noted that diodes 89 and 95 are poled for conducting current through potentiometer 86, 87 in the same direction and that terminals of like polarity of capacitors 57 and 92 are connected to the same terminals of potentiometer 86, 87. When switches 90 and 94 are both closed, diodes 89 and 95 automatically connect potentiometer 86, 87 across that one of the capacitors 57 and 92 having the greater voltage charge.

As the voltage across down slope control capacitor 92 increases, slider 88 of resistance 86 of the potentiometer becomes more and more negative and this increasing negative voltage applied to the control elements 52 of electric valves 47 and 48 make these electric valves less and less conducting and consequently increase their resistance value. The increased resistance value thus reflected into the primary winding 39 of impedance controlling transformer 40 progressively adjusts the phase shift circuit 32 to apply control voltages to the control elements 31 of firing electric discharge devices 20 and 21 at progressively later times so as to progressively decrease the amount of current supplied to the primary winding 2 of welding transformer 1 through main electric discharge devices 6 and 7 controlled by firing electric discharge devices 20 and 21.

The time at which capacitor 92 begins to charge is determined by a timer 96 having input conductors 97 and 98 and output conductors 99 and 100. So long as timer 96 is energized, its output conductor 100 is at a negative voltage relative to its output conductor 99 and this inhibits conduction through rectifier 101 which is in the charging circuit for capacitor 92.

Capacitor 92 is connected through a charging circuit including a fixed resistor 102 and an adjustable resistor 103 across a capacitor 104 which also has a discharge resistor 105 connected across its terminals. Capacitor 104 is connected across auxiliary supply conductors 81 and 82 through a resistor 106, the anode-cathode circuit of rectifier 101 and heating circuit conductor 67. Rectifier 101 has an anode 107, a cathode 108 and control elements 109 and 110. Control element 109 is connected to the cathode 108 of rectifier 101 and control element 110 is connected in circuit with a current limiting resistor 100', the output conductors 100 and 99 of timer 96 and heating circuit conductors 66 and 67 to the cathode 108 of rectifier 101. The cathode 108 of rectifier 101 is provided with a heating element 111 and the control element circuit for control element 110 of rectifier 101 is connected across the supply circuits 66, 67 for this heater to insure the application of a positive control voltage to control element 110 and thus insure anode-cathode conduction of rectifier 101 in the same manner previously described above when considering the same connections for rectifier 60. As indicated in the drawing, the rectifier 101 is an electric discharge device of the gaseous type having its electrodes enclosed within an envelope containing a gas or vapor as shown in the drawing by the dot associated with its cathode.

Timer 96 comprises a transformer 112 having a primary winding 113 and a mid-tap secondary winding 114. The primary winding 113 of this transformer is connected to the input conductors 97 and 98 of the timer and its secondary winding 114 is connected through rectifiers 115 and 116 to charge capacitors 117 and 118. Capacitor 117 is connected across the upper half of the secondary winding 114 of transformer 112 through rectifier 115 and capacitor 118 is connected across a fixed resistor 119 and rectifier 116 for charging in accordance with the voltage drop across resistance 119. This resistance 119 is connected in circuit with an adjustable calibrating resistance 120 across the lower half of the secondary winding 114 of transformer 112. Capacitor 118 has a greater capacitance than capacitor 117 and upon deenergization of rectifiers 116 and 115 discharges through a circuit including a fixed resistor 121 and an adjustable tapped resistor 122 into capacitor 117. It will be noted that the charging circuits for capacitors 118 and 117 are so arranged that the positive terminal of capacitor 118 is connected through resistances 121 and 122 to the negative terminal of capacitor 117 and that the negative terminal of capacitor 118 is directly connected to the positive terminal of capacitor 117. Thus so long as the timer 96 is energized, the negative terminal of capacitor 117 is connected through conductor 100 and resistance 100' to the control element 110 of rectifier 101 whose cathode 108 is connected across heating circuit conductors 66 and 67 to the positive terminal of this capacitor. Upon deenergization of the timer, capacitor 118 discharges into capacitor 117 and eventually reverses its voltage to a positive value substantially equal to the positive value of heating circuit conductor 66.

The timer 96 just described embodies the invention of Maurice E. Bivens, described and claimed in application Serial No. 311,503, entitled Electric Timer, filed September 25, 1952 and assigned to the assignee of this invention.

Input conductors 97 and 98 of timer 96 are respectively connected to one auxiliary supply conductor 81 and through controlled rectifier 123 and heating circuit conductor 67 to the other auxiliary supply conductor 82. Rectifier 123 has an anode 124, a cathode 125, a heating element 126 for this cathode and two control elements 127 and 128. This rectifier is an electric discharge device of the gaseous type having its electrodes enclosed within an envelope which contains a gas or vapor such as mercury or argon. This has been indicated in the drawing by the dot associated with the cathode of this rectifier. Like rectifiers 60 and 101, rectifier 123 may be a thyratron.

So long as load conductors 8 are de-energized, rectifier 123 is conducting and thus energizes the primary winding 113 of the timer transformer 112. This results from the fact that control element 127 of this rectifier is connected to its cathode and its other control element 128 is connected through a current limiting resistor 129, resistor 73 and conductor 72 to the heating circuit conductor 66 which is at a positive potential relative to heating circuit conductor 67 which is connected to cathode 125 of this rectifier. When the load conductors 8 become energized, however, voltage is applied to the primary winding 79 of transformer 77 and capacitor 75 is charged through a circuit including rectifier 78 and secondary winding 76 of this transformer. The charge across capacitor 75 appears across resistor 73 connected in parallel therewith and applies a negative voltage to control element 128 of rectifier 123 and thus renders it non-conductive when its anode voltage goes positive with the alternating current supplied thereto. Consequently timer 96 is de-energized and immediately starts its timing out operation to initiate, after the predetermined time set by its adjustable tapped resistor 122, conduction of rectifier 101 which initiates the charging of down slope capacitor 92 connected in its anode-cathode circuit.

As previously stated, the heaters and the heating circuits for firing electric discharge devices 20, 21, for electric valves 47 and 48 and for rectifiers 89, 95, 115 and 116, have not been illustrated in the drawing. They may be energized in the same manner as the heaters for rectifiers 60, 123 and 101 are energized, that is through a filament or heater circuit energized by a filament transformer whose primary is connected to supply conductors 5. Each of the electric discharge devices 20, 21 and rectifiers 60, 123 and 101 have a transient suppressing capacitor 130 connected between their principal control elements and cathodes.

From the description thus far given, it is believed to be apparent how the illustrated control circuit operates to provide up slope and down slope control during a welding operation. A summary statement with regard thereto is however considered desirable and will now be given.

The following preliminary adjustments are made. Adjustable resistor 37 of phase shift circuit 32 is set in accordance with the power factor phase angle of the load circuit as determined by the welding transformer and its connections in the welding machine. Adjustable resistor 38 of phase shift circuit 32 is also set in accordance with the magnitude of fixed level heating current flow required during the weld period per se. Slider 88 on resistor 86 of potentiometer 86, 87 is set to determine the magnitude of current flow at the beginning of up slope control and adjustable tapped resistor 122 of timer 96 is set to initiate down slope control at the end of the weld period at fixed level current flow. Switches 90 and 94 are closed to secure both the up and down slope control assuming this is the operation desired. Adjustable resistor 58 in the discharge circuit of up slope control capacitor 57 is set to determine the rate at which capacitor 57 discharges to determine thereby the rate at which welding current increases during up slope control. Adjustable resistor 103 in the charging circuit of down slope capacitor 92 is set in order to determine the rate at which this capacitor is charged to determine the rate at which current decreases from the fixed level weld value to a lesser value which may continue on to zero assuming that the operator keeps the pushbutton 23 closed and the electric valves 47 and 48 are rendered non-conducting by the charge built up across capacitor 92.

The system is energized by closing switch 4 to connect the source of supply 3 to the supply conductors 5 of the system. Energization of supply conductors 5 immediately energizes the various heating circuits for the electric discharge devices 20, 21, electric valves 47 and 48, rectifiers 89, 95, 115 and 116 and controlled rectifiers 60, 123 and 101. The energization of supply conductors 5 also energizes the operating winding 26 of relay 19 through conductors 27 which are connected across supply conductors 5. This relay begins to close its contacts and after the time interval determined by the adjustment of its dashpot 28 closes its contacts 18 in the energizing circuit 15 of main electric discharge devices 6 and 7. These electric discharge devices do not become conducting, however, until the pushbutton switch 23 is closed by the operator and firing electric discharge devices 20 and 21 also become conducting.

Meanwhile, after a delay period, control rectifier 60 has charged the up slope capacitor 57 which is connected across the now energized auxiliary supply conductors 81 and 82 through resistor 83, the anode-cathode circuit of rectifier 60 and heating circuit conductor 67. These auxiliary supply conductors are energized through transformer 84 as soon as switch 4 is closed to energize supply conductors 5 from the source of supply 3. Also timer 96 is energized by having the primary winding 113 of its transformer 112 connected across the auxiliary supply conductors 81 and 82 through conductors 97, 98, the anode-cathode circuit of rectifier 123 and heating circuit conductor 67. When thus energized, the timer applies a voltage to its output conductor 100 which is negative relative to its output conductors 99 and as these conductors are respectively connected to the control element 110 and cathode 108 of controlled rectifier 101, rectifier 101 is held non-conducting. Consequently, there is no charge across the down slope capacitor 92 since this capacitor and its supply capacitor 104 have discharged through the discharge circuit including resistor 105.

The charge on up slope capacitor 57 applies a voltage between the control elements 52 and cathodes 51 of electric valves 47 and 48 the magnitude of which depends upon the position of slider 88 on adjustable resistor 86 of potentiometer 86, 87 whose circuit is completed through diode 89 and switch 90 across the terminals of capacitor 57. Depending upon the adjustment of slider 88 on adjustable resistor 86 of the potentiometer, electric valves 47 and 48 have a corresponding conductivity and resistance value which is reflected into the primary winding 39 of control transformer 40 and thereby into phase shift circuit 32. This adjusts the phase shift circuit for applying control element voltages to the firing electric discharge devices 20 and 21 at some point in their positive anode voltages which is subsequent to the final heat or full heat limit settings determined by resistors 37 and 38 of the phase shift circuit.

When the operator closes pushbutton switch 23, firing electric discharge devices 20 and 21 become conducting at the phase angle of the exciter voltage supplied by phase shift circuit 32 and conductivity of firing electric discharge devices 20 and 21 render main electric discharge devices 6 and 7 conducting and the power circuit conducting so as to apply energization to the primary winding 2 of the welding transformer 1. The magnitude of current flow in the welding circuit will depend upon the adjustment of phase shift circuit 32 and will gradually increase as the voltage across up slope capacitor 57 decreases to zero as it discharges through its discharge circuit 58, 59. As capacitor 57 is discharged, electric valves 47 and 48 become more and more conducting and the phase angle of the phase shift circuit 32 is advanced causing conduction in firing electric discharge devices 20, 21, and main electric discharge devices 6 and 7 to occur earlier and earlier in each half cycle of their positive anode voltages until the final heat limit determined by adjustable resistor 38 of the phase shift circuit is obtained.

Conductivity of firing electric discharge devices 20 and 21 render main electric discharge devices 6 and 7 conductive in the following manner. Assume that the upper supply conductor 5 is at positive polarity, anode 12 of main electric discharge device 6 and anode 29 of firing electric discharge device 21 will both be at the same positive polarity assuming, of course, that pushbutton switch 23 is closed and that relay 19 has completed its contacts 18. Also assuming that firing electric discharge devices 20 and 21 become conducting when their control elements 31 are at the same or a more positive potential than their cathodes 30, it will be seen that electric discharge device 21 will become conductive when the voltage supplied from the phase shift circuit 32 causes its control element 31 to go positive relative to its cathode 30.

When firing electric discharge device 21 becomes conducting, current flows from the upper supply conductor 5 through the primary winding 2 of the welding transformer 1 and load conductors 8 through rectifier 25, contacts 22 of pushbutton switch 23, the anode-cathode circuit of firing electric discharge device 21, contacts 18 of relay 19 and rectifier 16 to control element 14 of main electric discharge device 6 and through this control element 14 and cathode 13 of main electric discharge device 6 to the other or negative supply conductor 5. The flow of current through control element 14 of main electric discharge device 6 initiates anode-cathode conduction thereof which continues for the remainder of its positive half cycle anode voltage. Thereupon conduction is transferred to the other main electric discharge device 7 provided of course its firing electric discharge device 20 is also conducting. The conductivity of firing electric discharge device 20 depends, as did the conductivity of firing electric discharge device 21, upon the application to its control element from the phase shift circuit 32 of a voltage positive relative to its cathode voltage. Thus the phase shift circuit determines the points in the positive half cycles of anode voltages at which the electric discharge devices 20, 21 and 6, 7 become conducting and these points of conductivity are varied in accordance with the phase variations of the output voltages of this phase shift circuit.

As soon as current is supplied to load conductors 8, the primary winding 79 of transformer 77 is energized through conductors 80 which are connected across these load conductors. This energizes the secondary winding 76 of this transformer which through rectifier 78 applies a charge across capacitor 75 which appears across resistor 73 in the control element circuit of controlled rectifier 60. Capacitor 75 is thus charged in a direction to apply a negative bias voltage to control element 64 of rectifier 60 and consequently immediately upon the energization of the load conductors 8, controlled rectifier 60 is rendered non-conducting and thus interrupts the charging of up slope capacitor 57. It is for this reason that immediately upon the flow of welding current, that the voltage across up slope capacitor 57 begins to decay and immediately imposes the up slope control.

Upon the energization of load conductors 8, controlled rectifier 123 is also rendered non-conducting in the same manner as controlled rectifier 60 was rendered non-conducting. This immediately sets timer 96 into operation to time out and after a predetermined time interval determined by the setting of its adjustable tapped resistor 122, controlled rectifier 101 is rendered conducting. Prior to this time, controlled rectifier 101 was held non-conducting by the negative bias applied to its control element 110 from timing capacitor 117 of timer 96. When controlled rectifier 101 becomes conducting, it starts the charging of down slope capacitor 92 and the increase in voltage across this capacitor appears across potentiometer 86, 87 which is connected therewith through diode 95. Timer 96 is set so that down slope capacitor 92 begins to charge after the weld time at fixed level heating current, that is after the preset value of maximum welding current has flowed for a predetermined time. Diodes 89 and 95 in circuit with potentiometer 86, 87 acts as an automatic isolating and switching means for the up slope capacitor 57 and the down slope capacitor 92. Thus if timer 96 had been set so that capacitor 92 comes into operation before up slope capacitor 57 has brought the welding current to the fixed level welding value, the more positively charged capacitor 92 will take over control.

As down slope capacitor 92 charges up, the control potential applied to control elements 52 of electric valves 47 and 48 goes more and more negative thereby increasing the resistance value of the primary winding 39 of control transformer 40 connected in phase shift circuit 32. This increase in resistance in the phase shift circuit will cause firing electric discharge devices 20 and 21 to become conducting later and later in their half cycles of positive anode voltage and this will cause the load current supplied through main electric discharge devices to taper off so that less and less current is supplied to the welding load.

One possible setting of this control has been illustrated in Fig. 2 of the drawings where during up slope control the load current is increased from zero value to the fixed level weld value, continues at this weld value for a certain time and is thereafter decreased to zero during the down slope period. Each of these three periods of current flow as well as the rates of current increase and current decrease and the fixed level of weld current is adjustable as has been pointed out above.

The welding operation is interrupted by opening pushbutton switch 23. As previously stated, this pushbutton switch is a simplification of the circuit diagram since ordinarily it would operate a sequence timer which would establish periods during which the welding electrodes 10 are brought into engagement with the work, welding current is supplied to the work, and the electrodes are held in engagement with the work after welding current flow has ended in order to complete the weld prior to opening the electrodes to release the work. Consequently, it is to be understood that any suitable timer for controlling one or more operations including the timing of welding current flow could be substituted for pushbutton switch 23.

The embodiment of our invention just described is, of course, subject to various modifications without departing from the spirit and scope of our invention. Thus other firing circuits than that disclosed may be employed for main electric discharge devices 6 and 7 and when the current demand is not great, the firing electric discharge devices may be used as load circuit devices. Furthermore, the phase shift circuit 32 may be variously modified as may the means embodied therein for controlling its phase shift setting. Thus in place of the adjustable impedance provided by control transformer 40, any other suitable arrangement may be employed such as a saturable reactor. The impedance of such a saturable reactor could be controlled by controlling the amount of direct current excitation applied to its direct current winding in response to the variations in voltage across the up slope and down slope capacitors 57 and 92. It is also apparent that any other type of timer 96 may be employed.

Our invention is not limited in its application to resistance welding control since it may also be used in any application where it is desired gradually to increase from an initial value to a preset value of current flow and thereafter decrease the current to a final value, all of which values are adjustable. Likewise the electric discharge devices, controlled rectifiers and electric valve arrangements disclosed may be of any suitable type which will accomplish the purpose required of them. Thus while we have shown and described one particular embodiment of our invention and suggested certain modifications thereof, it will be quite obvious to those skilled in the art that many other changes and modifications may be made without departing from our invention in its broadest aspect, and we, therefore, aim in the appended claims to cover all such changes and modifications as fall within the true spirit and scope of our invention.

What we claim as new and desire to secure by Letters Patent of the United States is:

1. Apparatus comprising supply conductors, load conductors, a pair of electric discharge devices having anodes and cathodes reversely connected in parallel with one another between one of said supply conductors and one of said load conductors and having control elements for controlling their anode-cathode conductivity, a phase shift circuit having means including an adjustable impedance for controlling its phase shift and having input conductors connected to said supply conductors and pairs of output conductors each pair of which is connected in circuit with the control element and cathode of one of said electric discharge devices, a first capacitor, means for charging said first capacitor to a predetermined voltage, a discharge circuit connected across said first capacitor, a second capacitor, means for charging said second capacitor at a predetermined rate, means responsive to the energization of said load conductors for interrupting the operation of said charging means for said first capacitor and, after a predetermined time interval, for initiating the operation of said charging means for said second capacitor, a potentiometer, means for selectively and automatically connecting said potentiometer across that one of said first and second capacitors having the greater voltage charge, and means responsive to the variation of voltage in said potentiometer for varying the impedance value of said adjustable impedance in accordance with said variation in potentiometer voltage.

2. Apparatus comprising supply conductors, load conductors, a pair of electric discharge devices having anodes and cathodes reversely connected in parallel with one another between one of said supply conductors and one of said load conductors and having control elements for controlling their anode-cathode conductivity, a phase shift circuit having means including an adjustable impedance for controlling its phase shift and having input conductors connected to said supply conductors and pairs of output conductors each pair of which is connected in circuit with the control element and cathode of one of said electric discharge devices, a first capacitor, means for charging said first capacitor to a predetermined voltage, a discharge circuit connected across said first capacitor, a second capacitor, means for charging said second capacitor at a predetermined rate, means responsive to the energization of said load conductors for interrupting the operation of said charging means for said first capacitor and after a predetermined time interval, for initiating the operation of said charging means for said second capacitor, a potentiometer having one terminal connected to terminals of like polarity of said first and second capacitors and another terminal connected to the other terminals of like polarity of said first and second capacitors through independent circuits each including a diode poled for conduction in the same direction through said potentiometer, and means responsive to the variation of voltage in said potentiometer for varying the impedance value of said adjustable impedance progressively in accordance with said variations in potentiometer voltage.

3. Apparatus comprising supply conductors, load conductors, a pair of electric discharge devices having anodes and cathodes reversely connected in parallel with one another between one of said supply conductors and one of said load conductors and having control elements for controlling their anode-cathode conductivity, a phase shift circuit having means including an adjustable impedance for controlling its phase shift and having input conductors connected to said supply conductors and pairs of output conductors each pair of which is connected in circuit with the control element and cathode of one of said electric discharge devices, an electric timer having input conductors and having output conductors across which there is a bias voltage which has, beginning with the deenergization of said input conductors of said timer, a time rate of voltage change from an initial value which is determined by the energization of said input conductors of said timer, means including a rectifier having an anode, a cathode and a control element and having its anode-cathode circuit connected in series with said input conductors of said timer across said supply conductors and having its control element to cathode circuit normally energized to establish conduction between its anode and cathode, means responsive to the energization of said load conductors for impressing a voltage in the control element to cathode circuit of said rectifier which renders its anode-cathode circuit non-conducting, a capacitor, means for charging said capacitor at a predetermined rate, said means including a second rectifier having an anode, a cathode and a control element and having its anode-cathode circuit connected in series with said capacitor across said supply conductors and having its control element to cathode circuit connected with said output conductors of said timer for inhibiting conduction between its anode and cathode until said bias voltage of said output conductors of said timer changes from its initial value to a value which initiates conduction between its anode and cathode, and means responsive to the voltage across said capacitor for varying the impedance value of said adjustable impedance progressively in accordance with the increasing voltage of said capacitor during its charging period.

4. Apparatus comprising alternating current supply conductors, alternating current load conductors, a pair of electric discharge devices having anodes and cathodes reversely connected in parallel with one another between one of said supply conductors and one of said load conductors and having control elements for controlling their anode-cathode conductivity, a phase shift circuit including the primary winding of a transformer having a mid-tap secondary winding, said phase shift circuit having input conductors connected to said supply conductors and pairs of output conductors each pair of which is connected in circuit with the control element and cathode of one of said electric discharge devices, a pair of variable conductivity electric valves having principal electrodes of like character respectively connected to the end terminals and to said mid-tap of said secondary winding of said transformer and each of said valves having a control electrode for determining the magnitude of its conductivity between its said principal electrodes in accordance with the excitation applied between said control electrode and one of said principal electrodes, an electric timer having input conductors and having output conductors across which there is a bias voltage which has, beginning with the deenergization of said input conductors of said timer, a time rate of voltage change from an initial value which is established by the energziation of said input conductors of said timer, means including a first rectifier having an anode, a cathode and a control element and having its anode-cathode circuit connected in series with said input conductors of said timer across said supply conductors and having its control element to cathode circuit normally energized to establish conduction between its anode and cathode, a first capacitor, a charging circuit for said first capacitor including a second rectifier having an anode, a cathode and a control element and having its anode-cathode circuit connected in series with said first capacitor across said supply conductors and having its control element to cathode circuit connected with the output conductors of said timer for inhibiting conduction between its anode and cathode until said bias voltage of said output conductors of said timer changes from its initial value to a value which initiates said conduction, a second capacitor, means for connecting said second capacitor across said first capacitor for charging therefrom at a predetermined rate, means responsive to the energization of said load conductors for impressing a voltage in the control element to cathode circuit of said first rectifier which renders its anode-cathode circuit non-conducting, and means for applying a voltage value of said second capacitor between said control elements and said ones of said principal electrodes of said pair of variable conductivity electric valves.

5. Apparatus comprising alternating current supply conductors, alternating current load conductors, a pair of electric discharge devices having anodes and cathodes reversely connected in parallel with one another between one of said supply conductors and one of said load conductors and having control elements for controlling their anode-cathode conductivity, a phase shift circuit including the primary winding of a transformer having a mid-tap secondary winding, said phase shift circuit having input conductors connected to said supply conductors and pairs of output conductors each pair of which is connected in circuit with the control element and cathode of one of said electric discharge devices, a pair of variable conductivity electric valves having principal electrodes of like character respectively connected to the end terminals and to said mid-tap of said secondary winding of said transformer and each of said valves having a control electrode for determining the magnitude of its conductivity between its said principal electrodes in accordance with the excitation applied between said control electrode and one of said principal electrodes, a first capacitor, a discharge circuit connected across said capacitor, a charging circuit for said first capacitor including a first rectifier having an anode, a cathode and a control element and having its anode-cathode circuit connected in series with said first capacitor across said supply conductors and having its control element to cathode circuit normally energized to establish conduction between its anode and cathode, an electric timer having input conductors and having output conductors across which there is a bias voltage which has, beginning with the deenergization of said input conductors of said timer, a time rate of voltage change from an initial value which is established by the energization of said input conductors of said timer, means including a second rectifier having an anode, a cathode and a control element and having its anode-cathode circuit connected in series with said input conductors of said timer across said supply conductors and having its control element to cathode circuit normally energized to establish conduction between its anode and cathode, a second capacitor, a charging circuit for said second capacitor including a third rectifier having an anode, a cathode and a control element and having its anode-cathode circuit connected in series with said second capacitor across said supply conductors and having its control element to cathode circuit connected with the output conductors of said timer for inhibiting conduction between its anode and cathode until said bias voltage of said output conductors of said timer changes from its initial value to a value which initiates conduction between its anode and cathode, a third capacitor, means for connecting said third capacitor across said second capacitor for charging therefrom at a predetermined rate, means responsive to the energization of said load conductors for impressing a voltage in the control element to cathode circuits of said first and second rectifiers which renders their anode-cathode circuits non-conducting, a potentiometer having one terminal connected to terminals of like polarity of said first and third capacitors and another terminal connected to the other terminals of like polarity of said first and third capacitors through a pair of independent circuits each including a diode poled for conduction in the same direction through said potentiometer, and means for applying a voltage of said potentiometer between said control elements and said ones of said principal electrodes of said pair of variable conductivity electric valves.

6. Apparatus comprising alternating current supply conductors, alternating current load conductors, an arc discharge device having an anode and a cathode respectively connected to one of said supply conductors and one of said load conductors and having a control element for controlling its anode-cathode conductivity, a phase shift circuit including the primary winding of a transformer and having input conductors connected to said supply conductors and a pair of output conductors connected in circuit with the control element and cathode of said arc discharge device, said transformer of said phase shift circuit having a secondary winding completed through the anode-cathode circuit of a vacuum type electric discharge device having an anode, a cathode and a control element, a capacitor, an adjustable discharge circuit connected across said capacitor, an adjustable voltage divider having end terminals connected across said capacitor and having an adjustable slider connected in circuit with the control element and cathode of said vacuum type electric discharge device to one of its said end terminals, a charging circuit for said capacitor connected across said supply conductors and including a controlled rectifier having an anode, a cathode and a control element and having its anode-cathode circuit connected in series with said capacitor and having a control circuit completed through its control element and cathode, and means energized from said load conductors for applying a control voltage to said control circuit of said rectifier which renders said rectifier non-conducting upon energization of said load conductors.

7. Apparatus comprising alternating current supply conductors, alternating current load conductors, a pair of electric discharge devices having anodes and cathodes reversely connected in parallel with one another between one of said supply conductors and one of said load conductors and having control elements for controlling their anode-cathode conductivity, a phase shift circuit including the primary winding of a transformer having a mid-tap secondary winding, said phase shift circuit having input conductors connected to said supply conductors and pairs of output conductors each pair of which is connected in circuit with the control element and cathode of one of said arc discharge devices, a pair of variable conductivity electric valves having principal electrodes of like character respectively connected to the end terminals and to said mid-tap of said secondary winding and each of said valves having a control electrode for determining the magnitude of its conductivity between its said principal electrodes in accordance with the excitation applied between said control electrode and one of said principal electrodes, a capacitor, an adjustable discharge circuit connected across said capacitor, an adjustable voltage divider having end terminals connected across said capacitor and having an adjustable slider connected in circuit with the control elements and cathodes of said electric valves to one of its said end terminals, a charging circuit for said capacitor connected across said supply conductors and including a controlled rectifier having an anode, a cathode and a control element and having its anode-cathode circuit connected in series with said capacitor and having a control circuit completed through its control element and cathode, and means connected to be responsive to an electrical characteristic of said load conductors for applying a control voltage to said control circuit of said rectifier which renders said rectifier non-conducting upon energization of said load conductors.

8. Control apparatus for use in an alternating current system wherein the periods of half cycle conductivity of a pair of electric discharge devices reversely connected in parallel with one another between supply conductors and load conductors is controlled by a phase shift circuit which is adjustable to vary the phase relationship of the voltages applied between the control elements and cathodes of said electric discharge devices relative to the voltages applied to their anodes and cathodes, said control apparatus comprising a transformer having a primary winding connectable in said phase shift circuit and having a mid-tap secondary winding, a pair of variable conductivity electric valves having principal electrodes of like character respectively connected to the end terminals and to said mid-tap of said secondary winding and each of said valves having a control electrode for determining the magnitude of its conductivity between its said principal electrodes in accordance with the excitation applied between said control electrode and one of said principal electrodes, a capacitor, an adjustable discharge circuit connected across said capacitor, an adjustable voltage divided having end terminals connected across said capacitor and having an adjustable slider connected in circuit with the control elements and one of said principal electrodes of said electric valves to one of its said end terminals, a charging circuit for said capacitor adapted to be connected across said supply conductors and including a controlled rectifier having an anode, a cathode and a control element and having its anode-cathode circuit connected in series with said capacitor and having a control circuit completed through its control element and cathode, and means including control conductors connectable with said load conductors for applying a control voltage to said control circuit of said rectifier which renders said rectifier non-conducting upon energization of said control conductors by said load conductors.

9. Control apparatus for use in an alternating current system where the time of initiation of conductivity of an electric discharge device having an anode, a cathode and a control element is controlled during positive half cycles of its anode voltage by a phase shift circuit which is adjustable to vary the phase relationship of the voltage applied between its control element and cathode relative to the voltage applied between its anode and cathode, said control apparatus comprising an adjustable impedance connectable in said phase shift circuit, a first capacitor, means for charging said first capacitor to a predetermined voltage, a discharge circuit connected across said first capacitor, a second capacitor, means for charging said second capacitor at a predetermined rate, means responsive to the energization of a pair of conductors connectable with said load conductors for interrupting the operation of said charging means for said first capacitor and, after a predetermined time interval, for initiating the operation of said charging means for second capacitor, a potentiometer, means for selectively and automatically connecting said potentiometer across that one of said first and second capacitors having the greatest voltage charge, and means responsive to the variation of voltage in said potentiometer for varying the impedance value of said adjustable impedance in accordance with said variation in potentiometer voltage.

10. Control apparatus for use in an alternating current system wherein the periods of half cycle conductivity of a pair of electric discharge devices reversely connected in parallel with one another between supply conductors and load conductors are controlled by a phase shift circuit which is adjustable to vary the phase relationship of the voltages applied between the control elements and cathodes of said electric discharge devices relative to the voltages applied to their anodes and cathodes, said control apparatus comprising a transformer having a primary winding connectable in said phase shift circuit and having a mid-tap secondary winding, a pair of variable conductivity electric valves having principal electrodes of like character respectively connected to the end terminals and to said mid-tap of said secondary winding and each of said valves having a control electrode for determining the magnitude of its conductivity between its said principal electrodes in accordance with the excitation applied between said control electrode and one of said principal electrodes, a first capacitor, a discharge circuit connected across said capacitor, a pair of auxiliary supply conductors connectable for energization from said supply conductors, a charging circuit for said first capacitor including a first rectifier having an anode, a cathode and a control element and having its anode-cathode circuit connected in series with said first capacitor across said auxiliary supply conductors and having its control element to cathode circuit normally energized to establish conduction between its anode and cathode, an electric timer having input conductors and having output conductors across which there is a bias voltage which has, beginning with the deenergization of said input conductors of said timer, a time rate of voltage change from an initial value which is established by the energization of said input conductors of said timer, means including a second rectifier having an anode, a cathode and a control element and having its anode-cathode circuit connected in series with said input conductors of said timer across said auxiliary supply conductors and having its control element to cathode circuit normally energized to establish conduction between its anode and cathode, a second capacitor, a charging circuit for said second capacitor including a third rectifier having an anode, a cathode and a control element and having its anode-cathode circuit connected in series with said second capacitor across said auxiliary supply conductors and having its control element to cathode circuit connected with the output conductors of said timer for inhibiting its anode-cathode conducting until said bias voltage of said output conductors of said timer changes from its initial value to a value which initiates conduction between its anode and cathode, a third capacitor, means for connecting said third capacitor across said second capacitor for charging therefrom at a predetermined rate, a pair of control conductors connectable across said load conductors, means responsive to the energization of said control conductors for impressing a voltage in the control element to cathode circuits of said first and second rectifiers which renders their anode-cathode circuits non-conducting, a potentiometer having one terminal connected to terminals of like polarity of said first and third capacitors and another terminal connected to the other terminals of like polarity of said first and third capacitors through a pair of independent circuits each including a diode poled for conduction in the same direction through said potentiometer, and means for applying a voltage of said potentiometer between said control elements and said ones of said principal electrodes of said pair of variable conductivity electric valves.

References Cited in the file of this patent
UNITED STATES PATENTS 2,472,044     Van Sciver _____ May 31, 1949